(12) United States Patent
Nakashima et al.

(10) Patent No.: US 10,899,941 B2
(45) Date of Patent: Jan. 26, 2021

(54) YELLOW INK COMPOSITION FOR NONAQUEOUS INKJET

(71) Applicant: SAKATA INX CORPORATION, Osaka (JP)

(72) Inventors: Okinori Nakashima, Osaka (JP); Yoshiyuki Aoki, Osaka (JP); Jun Kinjyo, Osaka (JP); Ryohei Miyake, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 80 days.

(21) Appl. No.: 16/325,161

(22) PCT Filed: Jul. 14, 2017

(86) PCT No.: PCT/JP2017/025669
§ 371 (c)(1),
(2) Date: Feb. 12, 2019

(87) PCT Pub. No.: WO2018/034090
PCT Pub. Date: Feb. 22, 2018

(65) Prior Publication Data
US 2019/0177563 A1    Jun. 13, 2019

(30) Foreign Application Priority Data

Aug. 19, 2016 (JP) ................. 2016-161022

(51) Int. Cl.
| | |
|---|---|
| C09D 11/36 | (2014.01) |
| C09D 11/322 | (2014.01) |
| B41J 2/01 | (2006.01) |
| B41M 5/00 | (2006.01) |
| C09B 29/52 | (2006.01) |
| C09B 35/033 | (2006.01) |
| C09D 11/033 | (2014.01) |
| C09D 11/037 | (2014.01) |
| C09D 11/107 | (2014.01) |
| C09D 11/38 | (2014.01) |

(52) U.S. Cl.
CPC ............. *C09D 11/36* (2013.01); *B41J 2/01* (2013.01); *B41M 5/00* (2013.01); *B41M 5/0023* (2013.01); *C09B 29/3665* (2013.01); *C09B 35/033* (2013.01); *C09D 11/033* (2013.01); *C09D 11/037* (2013.01); *C09D 11/107* (2013.01); *C09D 11/322* (2013.01); *C09D 11/38* (2013.01)

(58) Field of Classification Search
None
See application file for complete search history.

(56) References Cited

U.S. PATENT DOCUMENTS

| | | |
|---|---|---|
| 2015/0094408 A1 | 4/2015 | Morinaga et al. |
| 2016/0194508 A1 | 7/2016 | Yodo et al. |
| 2016/0272826 A1* | 9/2016 | Wang ............... C09D 11/38 |

FOREIGN PATENT DOCUMENTS

| | | |
|---|---|---|
| EP | 1911813 A1 | 4/2008 |
| EP | 3053971 A1 | 8/2016 |
| JP | 2005200469 A | 7/2005 |
| JP | 2012201710 A | 10/2012 |
| JP | 2016069607 A | 5/2016 |
| JP | 2017128694 A | 7/2017 |
| WO | 2007072804 A1 | 6/2007 |
| WO | 2013168205 A1 | 11/2013 |
| WO | 2015020128 A1 | 2/2015 |

OTHER PUBLICATIONS

International Search Report (ISR) dated Oct. 10, 2017, issued for International application No. PCT/JP2017/025669.
Extended European Search Report (EESR) dated Apr. 9, 2020, issued for European counterpart patent application No. EP17841318.3 (5 pages).
Notification Concerning Transmittal of International Preliminary Report on Patentability (PCT/IB326) and Notification of Transmittal of Translation of the International Preliminary Report on Patentability (PCT/IB/338) mailed Feb. 28, 2019, with International Preliminary Report on Patentability (PCT/IB/373) and Written Opinion of the International Searching Authority (PCT/ISA/237), for corresponding international application PCT/JP2017/025669, (12 pages).

* cited by examiner

*Primary Examiner* — Robert T Butcher
(74) *Attorney, Agent, or Firm* — Law Office of Katsuhiro Arai

(57) ABSTRACT

An object of the invention is to provide a yellow ink composition for nonaqueous inkjet that achieves excellent density and weather resistance on printed matters whose printing surface is constituted by a polyvinyl chloride polymer, ethylene-vinyl acetate copolymer, or other vinyl polymer or the like, while also ensuring excellent discharge stability, even in a high-speed printing mode. To this end, a yellow ink composition for nonaqueous inkjet is provided that contains, as the pigment, C. I. Pigment Yellow 150 and C. I. Pigment Yellow 83 at a ratio by mass, calculated by "C. I. Pigment Yellow 150/C. I. Pigment Yellow 83," of 5/5 to 9/1, and further contains a pigment dispersant, a resin, and an organic solvent.

15 Claims, No Drawings

YELLOW INK COMPOSITION FOR NONAQUEOUS INKJET

CROSS-REFERENCE TO RELATED APPLICATIONS

This application is the U.S. National Phase under 35 U.S.C. § 371 of International Application PCT/JP2017/025669, filed Jul. 14, 2017, which claims priority to Japanese Patent Application No. 2016-161022, filed Aug. 19, 2016. The International Application was published under PCT Article 21(2) in a language other than English.

TECHNICAL FIELD

The present invention relates to a yellow ink composition for nonaqueous inkjet suitable for use in the manufacture of large-size billboard ads, etc., whose printing surface is primarily constituted by a polyvinyl chloride polymer or ethylene-vinyl acetate copolymer, as well as a printed matter obtained using such yellow ink composition for nonaqueous inkjet.

BACKGROUND ART

Nowadays, a growing number of billboard ads are featuring photographic images of products and people's faces, in addition to logos and patterns of vivid colors and sophisticated designs. In addition, many of billboard ads are produced in large sizes to give stronger impact on the viewers. In general, traditional ways to produce billboard ads have been to cut out letters from colored sheets and attach the cutout letters to create logos, or to utilize various printing presses to create photographic images. However, these methods present problems in that they are time-consuming and labor-intensive and require large equipment such as printing presses.

Accordingly, attempts are made to simplify the production of billboards featuring vivid images by utilizing the inkjet method that permits designs created on a personal computer to be printed directly on base materials.

One feature of the inkjet method is that it supports a wide range of base materials to be printed on, making printing on paper, polymer, metal, and other hard and soft sheet materials not only possible, but effortless. For billboard ads that are installed outdoors and must therefore be lightweight, exceptionally strong and durable, resistant to rain, and also affordable, the inkjet method that permits easy printing on polymer sheets offering these exact properties presents a significant advantage.

In addition, super-wide-format inkjet printers accommodating printing widths of 2,000 mm or more have emerged of late, making the production of billboards even easier by allowing large printed matters to be produced in a single step instead of attaching smaller pieces together as the traditional method requires.

In general, tarpaulin is a common polymer sheet used for billboard ads. For reference, tarpaulin is a composite sheet using polyester or polyamide as a core material, on top and bottom of which a polyvinyl chloride polymer, ethylene-vinyl acetate copolymer, or other vinyl polymer is laminated.

For inkjet ink compositions to print on these composite sheets, nonaqueous inkjet ink compositions based on organic solvents (environmentally-friendly organic solvents in recent years) are used. Nonaqueous inkjet ink compositions must use materials having good wettability, drying property, fixing property, etc., on polyvinyl chloride polymers, ethylene-vinyl acetate copolymers, and other vinyl polymers that are used as surface materials for composite sheets.

Known ways to achieve this include: using alkylene glycol monoether monoester and cyclic ester as an organic solvent (refer to Patent Literature 1); using an organic solvent that contains a specific quantity of vinyl polymer as a binder resin and a specific quantity of environmentally-friendly polyalkylene glycol dialkyl ether as an organic solvent (refer to Patent Literature 2); and using an organic solvent that contains specific quantities of diethylene glycol ethyl methyl ether and propylene carbonate (refer to Patent Literature 3).

However, a growing demand for higher printing speed in recent years presents printing problems with the traditional nonaqueous inkjet ink compositions (especially nonaqueous inkjet ink compositions using environmentally-friendly organic solvents) in that these ink compositions, particularly yellow ones, have low coloring power and are therefore unable to achieve sufficient density on printed matters, and that using a large quantity of coloring agent to increase the coloring power reduces ink discharge stability, while using a coloring agent having high coloring power leads to poor weather resistance on printed matters.

BACKGROUND ART LITERATURE

Patent Literature

Patent Literature 1: Japanese Patent Laid-open No. 2005-200469
Patent Literature 2: International Patent Laid-open No. 2007/072804
Patent Literature 3: International Patent Laid-open No. 2015/020128

SUMMARY OF THE INVENTION

Problems to be Solved by the Invention

An object of the invention is to provide a yellow ink composition for nonaqueous inkjet that achieves excellent density and weather resistance on printed matters, while also ensuring excellent discharge stability.

Means for Solving the Problems

After studying in earnest to achieve the aforementioned object, the inventors of the present invention found that the object could be achieved by combining multiple types of specific yellow pigments.

To be specific, the present invention is characterized as follow:

(1) A yellow ink composition for nonaqueous inkjet that contains C. I. Pigment Yellow 150 and C. I. Pigment Yellow 83 at a ratio by mass, calculated by "C. I. Pigment Yellow 150/C. I. Pigment Yellow 83," of 5/5 to 9/1, and further contains a pigment dispersant, a resin, and an organic solvent.

(2) A yellow ink composition for nonaqueous inkjet according to (1), wherein the ink composition contains, as the resin, an acrylic resin by 1 to 15 percent by mass.

(3) A yellow ink composition for nonaqueous inkjet according to (1) or (2), wherein the ink composition contains, as the organic solvent, propylene carbonate and diethylene glycol dialkyl ether.

(4) A yellow ink composition for nonaqueous inkjet according to any one of (1) to (3), wherein the ink composition contains the propylene carbonate by 5 to 25 percent by mass, and it contains the diethylene glycol dialkyl ether so that its ratio by mass relative to the propylene carbonate, calculated by "Diethylene glycol dialkyl ether/Propylene carbonate," becomes 3.0 to 8.0.

(5) A yellow ink composition for nonaqueous inkjet according to any one of (1) to (4), wherein the diethylene glycol dialkyl ether is diethylene glycol ethyl methyl ether and/or diethylene glycol diethyl ether.

Effects of the Invention

The yellow ink composition for nonaqueous inkjet proposed by the present invention contains multiple types of specific yellow pigments, a pigment dispersant, a resin, and an organic solvent.

This way, a yellow ink composition for nonaqueous inkjet that achieves excellent density and weather resistance on printed matters, while also ensuring excellent discharge stability, can be provided.

MODE FOR CARRYING OUT THE INVENTION (Pigment)

The essential pigment components that constitute the yellow ink composition for nonaqueous inkjet proposed by the present invention are C. I. Pigment Yellow 150 and C. I. Pigment Yellow 83, where their ratio by mass, calculated by "C. I. Pigment Yellow 150/C. I. Pigment Yellow 83," is 5/5 to 9/1, or preferably 6/4 to 8/2. When it contains the two components at the aforementioned ratios, the ink composition will achieve good discharge stability as well as good density and weather resistance on printed matters. If the ratio is lower than 5/5, the weather resistance on printed matters may drop, while a ratio exceeding 9/1 may cause the discharge stability of the ink composition to drop.

The use quantity of the pigments that constitute the yellow ink composition for nonaqueous inkjet proposed by the present invention is preferably 1.0 to 10.0 percent by mass, or more preferably 1.5 to 7.0 percent by mass, or even more preferably 2.0 to 3.0 percent by mass, relative to the total quantity of the yellow ink composition for nonaqueous inkjet. If the pigment use quantity is less than 1.0 percent by mass, the coloring power tends to become insufficient, while a use quantity exceeding 10.0 percent by mass tends to cause the viscosity to rise and the ink fluidity to drop.

In addition, the OD value of the yellow ink composition for nonaqueous inkjet measured under the following conditions is preferably 1.0 or greater, or more preferably 1.5 or greater.

It should be noted that any known inorganic pigment, organic pigment, etc., traditionally used in nonaqueous inkjet ink compositions may also be used, to the extent that doing so does not cause these performances to drop or present problems with the hue.

Specific examples of known inorganic pigments include carbon black, titanium oxide, zinc flower, zinc oxide, lithopone, iron oxide, aluminum oxide, silicon dioxide, kaolinite, montmorillonite, talc, barium sulfate, calcium carbonate, silica, alumina, cadmium red, red iron oxide, molybdenum red, chrome vermilion, molybdate orange, yellow lead, chrome yellow, cadmium yellow, yellow iron oxide, titanium yellow, chromium oxide, viridian, cobalt green, titanium cobalt green, cobalt chrome green, sea blue, ultramarine blue, Prussian blue, cobalt blue, cerulean blue, manganese violet, cobalt violet, mica, etc.

Specific examples of organic pigments include azo, azomethine, polyazo, phthalocyanine, quinacridone, anthraquinone, indigo, thioindigo, quinophthalone, benzimidazolone, isoindoline, isoindolinone, and other organic pigments, while specific examples in terms of color index designations include Pigment Black 7, Pigment Blue 15, 15:1, 15:3, 15:4, 15:6, 60, Pigment Green 7, 36, Pigment Red 9, 48, 49, 52, 53, 57, 97, 122, 149, 168, 177, 178, 179, 206, 207, 209, 242, 254, 255, Pigment Violet 19, 23, 29, 30, 37, 40, 50, Pigment Yellow 12, 13, 14, 17, 20, 24, 74, 86, 93, 94, 95, 109, 110, 117, 120, 125, 128, 137, 138, 139, 147, 148, 151, 154, 155, 166, 168, 180, 185, Pigment Orange 36, 43, 51, 55, 59, 61, 71, 74, etc.

(Pigment Dispersant)

Next, for the pigment dispersant that constitutes the yellow ink composition for nonaqueous inkjet proposed by the present invention, any ionic or nonionic surfactant, anionic, cationic or nonionic polymer compound, and the like may be used. From the viewpoint of improving, in a balanced manner, the discharge stability of the ink composition and its density and weather resistance on printed matters, pigment dispersants made of anionic, cationic, and nonionic polymer compounds are preferred, where carbodiimide group-containing polymer compounds, AJISPER (manufactured by Ajinomoto Fine-Techno), SOLSPERSE (manufactured by Lubrizol), DISPERBYK (manufactured by BYK Chemie), and Efka (manufactured by Efka Additives) are more preferred. Any one type of these pigment dispersants may be used alone, or two or more types may be combined.

It should be noted that the aforementioned pigment dispersants may be selected and used as deemed appropriate according to the types of pigments and the type of organic solvent used.

(Resin)

As the resin that constitutes the yellow ink composition for nonaqueous inkjet proposed by the present invention, a polymer comprising a (meth)acrylate soluble in organic solvent, a copolymer thereof, and the like can be listed. Examples of such (meth)acrylate include ethyl, propyl, or butyl (meth)acrylates, and other alkyl (meth)acrylates, as well as hydroxy methyl, hydroxy ethyl, hydroxy propyl, hydroxy butyl, or hydroxy pentyl (meth)acrylates, other hydroxy alkyl (meth)acrylates, and the like.

Specific examples of acrylic resins that may be used include BR-60, BR-64, BR-75, BR-77, BR-83, BR-87, BR-88, BR-90, BR-93, BR-95, BR-105, BR-106, BR-107, BR-108, BR-113, BR-115, and BR-116 manufactured by Mitsubishi Rayon, among others.

Any of these acrylic resins may be used alone, or two or more types may be combined.

The use quantity of acrylic resin is preferably 1.0 to 15.0 percent by mass, or more preferably 2.0 to 12.0 percent by mass, or even more preferably 3.0 to 10.0 percent by mass, relative to the total quantity of the yellow ink composition for nonaqueous inkjet.

If the total quantity of acrylic resin is less than 1 percent by mass, the ink composition will not be fixed sufficiently on the base material and may bleed, while a use quantity exceeding 15.0 percent by mass results in an excessive solids content, which may cause discharge stability to drop.

It should be noted that any resin other than the aforementioned acrylic resins, such as ketone resin, polyvinyl chloride resin, vinyl chloride-vinyl acetate resin, ethylene-vinyl acetate resin, styrene-acrylic resin, styrene-maleic acid resin, rosin resin, rosin ester resin, petroleum resin, coumarone indene resin, terpenophenolic resin, phenolic resin, urethane resin, melamine resin, urea resin, epoxy resin, cellulose resin, xylene resin, alkyd resin, aliphatic hydrocarbon resin, butyral resin, maleic acid resin, fumaric acid resin, etc., may also be added, to the extent that doing so does not cause these performances to drop.

(Organic Solvent)

The organic solvent that constitutes the yellow ink composition for nonaqueous inkjet proposed by the present invention is not limited in any way, but preferably it contains a diethylene glycol dialkyl ether and a propylene carbonate. For the diethylene glycol dialkyl ether, in particular, a diethylene glycol diethyl ether or diethylene glycol dimethyl ether may be used.

The content of propylene carbonate used is preferably 5.0 to 25.0 percent by mass, or more preferably 5.0 to 20.0 percent by mass, or most preferably 5.0 to 15.0 percent by mass from the viewpoint of improving the drying property further, in the yellow ink composition for nonaqueous inkjet.

The content of diethylene glycol dialkyl ether used is preferably 40.0 to 80.0 percent by mass in the yellow ink composition for nonaqueous inkjet.

Furthermore, the diethylene glycol dialkyl ether is used, relative to the propylene carbonate, at a ratio by mass, calculated by "Diethylene glycol dialkyl ether/Propylene carbonate," of preferably 3.0 to 8.0, or more preferably 5.0 to 8.0.

By combining diethylene glycol dialkyl ether and propylene carbonate, excellent wettability, fixing property and solid fill property, as well as excellent discharge stability, can be achieved even under high speed printing.

Moreover, an alkylene glycol derivative having a flash point of 50 to 150° C., other than diethylene glycol dialkyl ether, may also be added to adjust the drying property.

Examples of such alkylene glycol derivatives having a flash point of 50 to 150° C. include: ethylene glycol diethyl ether, ethylene glycol dimethyl ether, triethylene glycol dimethyl ether, triethylene glycol diethyl ether, tetraethylene glycol dimethyl ether, and other (poly)ethylene glycol dialkyl ethers; propylene glycol dimethyl ether, propylene glycol diethyl ether, dipropylene glycol dimethyl ether, dipropylene glycol diethyl ether, propylene glycol diethyl ether, tetrapropylene glycol dimethyl ether, and other (poly)propylene glycol dialkyl ethers; propylene glycol monomethyl ether, propylene glycol monoethyl ether, propylene glycol monobutyl ether, dipropylene glycol monomethyl ether, dipropylene glycol monoethyl ether, and other (poly)propylene glycol monoalkyl ethers; propylene glycol monomethyl ether acetate, propylene glycol monoethyl ether acetate, propylene glycol monobutyl ether acetate, dipropylene glycol monomethyl ether acetate, dipropylene glycol monoethyl ether acetate, dipropylene glycol monobutyl ether acetate, and other (poly)propylene glycol monoalkyl ether monoalkyl esters; ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monobutyl ether, and other (poly)ethylene glycol monoethers; ethylene glycol monomethyl acetate, ethylene glycol monoethyl acetate, ethylene glycol monobutyl acetate, diethylene glycol monomethyl acetate, triethylene glycol monomethyl acetate, and other (poly)ethylene glycol monoesters; ethylene glycol diacetate, diethylene glycol diacetate, triethylene glycol diacetate, and other (poly)ethylene glycol diesters; and ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, diethylene glycol propyl ether acetate, triethylene glycol monobutyl ether, triethylene glycol ethyl ether acetate, triethylene glycol butyl ether acetate, other (poly)ethylene glycol monoether monoesters, and the like.

In addition, the total quantity of organic solvent preferably accounts for 70.0 to 90.0 percent by mass in the total yellow ink composition. If the total quantity exceeds 90.0 percent by mass, the printability of the obtained ink drops, while a total quantity of less than 70.0 percent by mass induces a rise in the viscosity of the ink and ink discharge property from the nozzle tends to drop, which is not desirable.

(Other Components)

Also, other resins may be added to the yellow ink composition for nonaqueous inkjet proposed by the present invention, and various other additives such as surfactant, plasticizer, surface adjustment agent, ultraviolet protective agent, photostabilizer, and antioxidant may be used further, as necessary, to the extent that doing so does not reduce the effects of the present invention.

[Manufacturing of Yellow Ink Composition for Nonaqueous Inkjet]

Next, a method for manufacturing the yellow ink composition for nonaqueous inkjet proposed by the present invention using these materials is explained.

The yellow ink composition for nonaqueous inkjet proposed by the present invention may be obtained by, for example, dispersing and mixing the ingredients using a wet circulation mill, bead mill, ball mill, sand mill, attritor, roll mill, DCP mill, agitator, Henschel mixer, colloid mill, ultrasonic homogenizer, high-pressure homogenizer (Microfluidizer, Nanomizer, Ultimizer, Genus PY, DeBEE2000, etc.), pearl mill, or other dispersion machine, and then adjusting the viscosity of the yellow ink composition for nonaqueous inkjet to between 2 and 10 mPa·s.

Preferably the total content of organic solvent in the yellow ink composition for nonaqueous inkjet proposed by the present invention, which represents the total quantity of yellow ink composition, less the total quantity of binder resin, pigment, pigment dispersant, and other additives used as necessary, is changed as deemed appropriate so that the ink viscosity falls in the aforementioned range.

The yellow ink composition for nonaqueous inkjet proposed by the present invention, as obtained above, may be used on a base material whose surface layer, at least, is constituted by vinyl chloride polymer, ethylene-vinyl acetate copolymer, etc., through an inkjet printer.

[Applications]

The yellow ink composition for nonaqueous inkjet proposed by the present invention may be used for known applications; however, it is particularly suited for use on base materials whose surface layer is constituted by a nonabsorbent material. Nonabsorbent materials include metals, resins, ceramics, etc., but from the viewpoints of printability characteristics such as solid filling, stickiness, and the like, preferably the present invention is used on surface layers primarily made of resins, or specifically on surface layers whose constituent resin is a polyvinyl chloride polymer or ethylene-vinyl acetate copolymer.

EXAMPLES

The present invention is explained in detail by citing examples below; it should be noted, however, that the present invention is not limited to these examples. It should also be noted that, unless otherwise specified, "%" represents "percent by mass," while "part" represents "part by mass."

The following are the materials used in the Examples and Comparative Examples described below.

<Pigments>
G01: Levascreen Yellow G01 (manufactured by LANXESS, C. I. Pigment Yellow 150)
HR04: Novoperm Yellow HR04 (manufactured by Clariant, C. I. Pigment Yellow 83)

<Pigment Dispersant>
PB 822 AJISPER PB822 (manufactured by Ajinomoto Fine-Techno)

<Acrylic Resin>
BR-87 Dianal BR-87 (manufactured by Mitsubishi Rayon, glass transition temperature 105° C., mass-averaged molecular weight 25,000)

<Solvents>
DEDG: Diethylene glycol diethyl ether
EDM: Diethylene glycol ethyl methyl ether
PC: Propylene carbonate
DPMA: Dipropylene glycol methyl ether acetate <Manufacturing of Yellow Ink Composition for Nonaqueous Inkjet>

The materials were mixed under agitation according to the recipes in Table 1 (the blending ratio of each material is based on percent by mass), after which the mixtures were kneaded using a bead mill, to obtain the yellow ink compositions for nonaqueous inkjet in Examples 1 to 4 and Comparative Examples 1 to 5.

(Printing Method and Printed Matters)

Each of the yellow ink compositions for nonaqueous inkjet in Examples 1 to 4 and Comparative Examples 1 to 5 was charged to a commercial inkjet printer, which was then used to perform solid printing on a polyvinyl chloride sheet in a high-speed printing mode, to obtain the printed matters in Examples 1 to 4 and Comparative Examples 1 to 5.

<Evaluation>

The following properties were evaluated on the printed matters obtained using the yellow ink compositions for nonaqueous inkjet in Examples 1 to 4 and Comparative Examples 1 to 5. In the following evaluations, A and B represent levels acceptable for practical use, while C and D represent levels not acceptable for use as a product.

(Viscosity)

The yellow ink compositions for nonaqueous inkjet in Examples 1 to 4 and Comparative Examples 1 to 5 were measured for viscosity at 25° C. using a viscometer (RE100L manufactured by Toki Sangyo).

(Discharge Stability)

The yellow ink compositions for nonaqueous inkjet in Examples 1 to 4 and Comparative Examples 1 to 5 were used to print on polyvinyl chloride sheets (product name: Kapjet Gloss Banner, manufactured by Filmolux), and the results were evaluated based on the number of sheets on which unprinted areas appeared. Evaluation Criteria A: Unprinted areas appeared on the 71st or subsequent sheet, or no unprinted areas appeared until the 100th sheet.
B: Unprinted areas appeared on any of the 51st through 70th sheets.
C: Unprinted areas appeared on any of the 31st through 50th sheets.
D: Unprinted areas appeared on the 30th or earlier sheet.

(OD Value)

The yellow ink compositions for nonaqueous inkjet in Examples 1 to 4 and Comparative Examples 1 to 5 were spread onto vinyl chloride media using a 0.15-mm Mayer bar, and then measured for OD value using a spectrophotometer (product name: SpectroEye, manufactured by X-Rite).

(Weather Resistance)

The yellow ink compositions for nonaqueous inkjet in Examples 1 to 4 and Comparative Examples 1 to 5 were spread onto vinyl chloride media using a 0.15-mm Mayer bar, after which the media were tested for 1,000 hours using a weather resistance tester (product name: Q-SUN, manufactured by Q-Lab) and then measured for color difference ($\Delta E$) using a spectrophotometer (product name: SpectroEye, manufactured by X-Rite), to evaluate weather resistance.

Evaluation Criteria
A: $\Delta E$ is lower than 10.
B: $\Delta E$ is 10 or higher, but lower than 20.
C: $\Delta E$ is 20 or higher, but lower than 40.
D: $\Delta E$ is 40 or higher.

TABLE 1

|  |  | Examples | | | |
| --- | --- | --- | --- | --- | --- |
|  |  | 1 | 2 | 3 | 4 |
| Pigment | G01 (C.I. pigment yellow 150) | 2.70 | 2.00 | 1.75 | 1.00 |
|  | HR04 (C.I. pigment yellow 83) | 0.30 | 0.50 | 0.75 | 1.00 |
| Dispersant | PB822 | 1.20 | 1.00 | 1.00 | 0.80 |
| Resin | BR-87 | 8.00 | 8.00 | 8.00 | 8.00 |
| Solvent | DEDG | 47.80 | 48.50 | 48.50 | 49.20 |
|  | EDM | 20.00 | 20.00 | 20.00 | 20.00 |
|  | PC | 10.00 | 10.00 | 10.00 | 10.00 |
|  | DPMA | 10.00 | 10.00 | 10.00 | 10.00 |
|  | Total | 100.00 | 100.00 | 100.00 | 100.00 |
|  | Viscosity (mPa · s) | 6.0 | 6.0 | 6.0 | 6.0 |
| Pigment ratio P.Y. 150/P.Y 83 (mass/mass) |  | 9/1 | 8/2 | 7/3 | 5/5 |
| Pigment concentration |  | 3.0% | 2.5% | 2.5% | 2.0% |
|  | OD value | 1.2 | 1.2 | 1.2 | 1.2 |
|  | Weather resistance | A | A | A | B |
|  | Discharge stability | A | A | A | A |

|  |  | Comparative Examples | | | | |
| --- | --- | --- | --- | --- | --- | --- |
|  |  | 1 | 2 | 3 | 4 | 5 |

TABLE 1-continued

| | | | | | | |
|---|---|---|---|---|---|---|
| Pigment | G01 (C.I. pigment yellow 150) | 4.00 | 3.00 | | | 0.80 |
| | HR04 (C.I. pigment yellow 83) | | | 4.00 | 1.50 | 1.20 |
| Dispersant | PB822 | 1.60 | 1.20 | 1.60 | 0.60 | 0.80 |
| Resin | BR-87 | 8.00 | 8.00 | 8.00 | 8.00 | 8.00 |
| Solvent | DEDG | 46.40 | 47.80 | 46.40 | 49.90 | 49.20 |
| | EDM | 20.00 | 20.00 | 20.00 | 20.00 | 20.00 |
| | PC | 10.00 | 10.00 | 10.00 | 10.00 | 10.00 |
| | DPMA | 10.00 | 10.00 | 10.00 | 10.00 | 10.00 |
| | Total | 100.00 | 100.00 | 100.00 | 100.00 | 100.00 |
| | Viscosity (mPa · s) | 6.0 | 6.0 | 6.0 | 6.0 | 6.0 |
| | Pigment ratio P.Y 150/P.Y 83 (mass/mass) | 10/0 | 10/0 | 0/10 | 0/10 | 4/6 |
| | Pigment concentration | 4.0% | 3.0% | 4.0% | 1.5% | 2.0% |
| | OD value | 1.2 | 0.9 | 2.0 | 1.2 | 1.2 |
| | Weather resistance | A | A | D | D | C |
| | Discharge stability | C | B | C | A | A |

According to the results of Examples 1 to 4 shown in Table 1, the yellow ink compositions for nonaqueous inkjet conforming to the compositional makeup proposed by the present invention offer viscosities that make these yellow ink compositions appropriate for use in inkjet printing. Also, an OD value of 1.2 can be maintained, even after the pigment concentration is lowered to 2%, which means that excellent coloring power can be ensured. In addition, the obtained inks offer excellent weather resistance and discharge stability, as well as a balanced set of various properties.

On the other hand, Comparative Example 1 that did not use C. I. Pigment Yellow 83 resulted in poor discharge stability when the pigment concentration was adjusted to achieve an OD value of 1.2. According to Comparative Example 2, which was identical to Comparative Example 1 except that the pigment concentration was lower, weather resistance and discharge stability were good, but the OD value dropped to 0.9. Comparative Examples 3 and 4 that did not use C. I. Pigment Yellow 150 and had an OD value of 1.2 or higher, failed to achieve acceptable levels of weather resistance and discharge stability at the same time. Also, Comparative Example 5 that used both C. I. Pigment Yellow 150 and C. I. Pigment Yellow 83, but at a lower mass ratio, exhibited poor weather resistance when the pigment concentration was adjusted to achieve an OD value of 1.2.

What is claimed is:

1. A yellow ink composition for nonaqueous inkjet that contains C. I. Pigment Yellow 150 and C. I. Pigment Yellow 83 at a ratio by mass, calculated by C. I. Pigment Yellow 150/C. I. Pigment Yellow 83, of 5/5 to 9/1, and further contains a pigment dispersant, a resin, and an organic solvent.

2. The yellow ink composition for nonaqueous inkjet according claim 1, wherein the ink composition contains the resin in an amount of 1 to 15 percent by mass, wherein the resin is an acrylic resin.

3. The yellow ink composition for nonaqueous inkjet according to claim 1, wherein the ink composition contains, as the organic solvent, propylene carbonate and diethylene glycol dialkyl ether.

4. The yellow ink composition for nonaqueous inkjet according to claim 1, wherein the ink composition contains 5 to 25 percent by mass propylene carbonate, and it contains diethylene glycol dialkyl ether so that its ratio by mass relative to the propylene carbonate, calculated by Diethylene glycol dialkyl ether/Propylene carbonate, is 3.0 to 8.0.

5. The yellow ink composition for nonaqueous inkjet according to claim 2, wherein the ink composition contains, as the organic solvent, propylene carbonate and diethylene glycol dialkyl ether.

6. The yellow ink composition for nonaqueous inkjet according to claim 2, wherein the ink composition contains 5 to 25 percent by mass propylene carbonate, and it contains diethylene glycol dialkyl ether so that its ratio by mass relative to the propylene carbonate, calculated by Diethylene glycol dialkyl ether/Propylene carbonate, is 3.0 to 8.0.

7. The yellow ink composition for nonaqueous inkjet according to claim 3, wherein the ink composition contains 5 to 25 percent by mass propylene carbonate, and it contains the diethylene glycol dialkyl ether so that its ratio by mass relative to the propylene carbonate, calculated by Diethylene glycol dialkyl ether/Propylene carbonate, is 3.0 to 8.0.

8. The yellow ink composition for nonaqueous inkjet according to claim 5, wherein the ink composition contains 5 to 25 percent by mass propylene carbonate, and it contains the diethylene glycol dialkyl ether so that its ratio by mass relative to the propylene carbonate, calculated by Diethylene glycol dialkyl ether/Propylene carbonate, is 3.0 to 8.0.

9. The yellow ink composition for nonaqueous inkjet according to claim 3, wherein the diethylene glycol dialkyl ether is diethylene glycol ethyl methyl ether and/or diethylene glycol diethyl ether.

10. The yellow ink composition for nonaqueous inkjet according to claim 5, wherein the diethylene glycol dialkyl ether is diethylene glycol ethyl methyl ether and/or diethylene glycol diethyl ether.

11. The yellow ink composition for nonaqueous inkjet according to claim 4, wherein the diethylene glycol dialkyl ether is diethylene glycol ethyl methyl ether and/or diethylene glycol diethyl ether.

12. The yellow ink composition for nonaqueous inkjet according to claim 5, wherein the diethylene glycol dialkyl ether is diethylene glycol ethyl methyl ether and/or diethylene glycol diethyl ether.

13. The yellow ink composition for nonaqueous inkjet according to claim 6, wherein the diethylene glycol dialkyl ether is diethylene glycol ethyl methyl ether and/or diethylene glycol diethyl ether.

14. The yellow ink composition for nonaqueous inkjet according to claim 7, wherein the diethylene glycol dialkyl ether is diethylene glycol ethyl methyl ether and/or diethylene glycol diethyl ether.

15. The yellow ink composition for nonaqueous inkjet according to claim 8, wherein the diethylene glycol dialkyl ether is diethylene glycol ethyl methyl ether and/or diethylene glycol diethyl ether.

* * * * *